United States Patent [19]

McHugh et al.

[11] Patent Number: 4,494,766
[45] Date of Patent: Jan. 22, 1985

[54] TRAILER FOR CARRYING LARGE VEHICLES

[75] Inventors: Edward L. McHugh, Langhorne; James C. McHugh, Penndel; Gerard J. McHugh, Langhorne; William Gallagher, Levittown; David Schmidt, Langhorne, all of Pa.

[73] Assignee: McHugh Brothers Crane Rentals, Inc., Penndel, Pa.

[21] Appl. No.: 456,272

[22] Filed: Jan. 6, 1983

[51] Int. Cl.³ .............................................. B62D 13/04
[52] U.S. Cl. .................................. 280/444; 280/81 B; 410/3; 410/11; 414/484
[58] Field of Search ............... 280/444, 445, 443, 103, 280/6 R, 6 H, 81 B, DIG. 9; 414/484, 485; 410/2, 3, 4, 5, 10, 11, 24, 25, 44

[56] References Cited

U.S. PATENT DOCUMENTS

| | | | |
|---|---|---|---|
| 2,002,604 | 5/1935 | Johnson | 280/444 X |
| 2,818,275 | 12/1957 | Hollowell | 280/443 |
| 2,940,769 | 6/1960 | Taylor | 280/103 X |
| 3,114,426 | 12/1963 | Larsen | 280/103 X |
| 3,131,950 | 5/1964 | Weaver et al. | 280/6 R |
| 3,386,747 | 6/1968 | Watt | 280/6 R |
| 4,335,901 | 6/1982 | Gladish | 280/6 R |

FOREIGN PATENT DOCUMENTS

518001 3/1953 Belgium ............................ 280/81 B

*Primary Examiner*—John A. Pekar
*Attorney, Agent, or Firm*—Steele, Gould & Fried

[57] ABSTRACT

A drawbar trailer for transporting very long, very heavy, substantially rigid loads, the trailer having a load support platform carried by at least one front and at least one rear axle and separable wheel assembly, the trailer comprising: an adjustable suspension system having inflatable members disposed between the platform and the front and rear axles for selectively raising and lowering the front and rear of the platform and for selectively raising and lowering the sides of the platform; the drawbar being pivotably mounted to the platform about a substantially vertical axis; a mechanism, preferably hydraulic, for turning the wheels of at least one of the front and rear axle and wheel assemblies; an automatic control system for activating the turning mechanism in response to pivotal movements of the drawbar; and, members for securing the load to the platform, whereby the tilt axes of the load support platform can be adjusted with respect to the axle and wheel assemblies, and in turn, with respect to terrain features. In the presently preferred embodiment, the drawbar trailer is particularly adapted for transporting rapid transit subway cars, railcars and like vehicles having internal suspension systems. Such a specially adapted drawbar trailer further comprises support members for holding and immobilizing the bodies of the carried vehicles with respect to the platform, preventing movement of the vehicle bodies on their internal suspension systems. The load support platform may be inclined about its tilt axes to facilitate loading, carrying and unloading the carried vehicle.

19 Claims, 19 Drawing Figures

TRAILER FOR CARRYING LARGE VEHICLES

BACKGROUND OF THE INVENTION

1. Field of the Invention

This invention relates to the field of vehicle-carrying trailers, and in particular to a drawbar trailer for safely carrying rapid transit subway cars, large railroad cars and other very long, very heavy loads over roads.

2. Description of the Prior Art

Trailers for carrying vehicles are well known, however, such trailers most frequently are substantially larger than the vehicle carried, and often are adapted to carry a plurality of such smaller vehicles. Where relatively large vehicles must be carried, for example large construction equipment, tracked vehicles and the like, flat-bed trailers are normally employed. Even in such cases, the usual trailer is much larger than the vehicle carried.

In order to carry a vehicle which is large in comparison to vehicles most frequently encountered on roads, some provision must be made to assist in steering. Roads are engineered such that only vehicles of certain maximum distance between the front and rear wheels can be accommodated in the space allowed for curves, hills and the like. If a trailer is composed of a series of articulated, connected subelements, a large collection of such elements can follow the path taken by the lead element, and thereby be accommodated upon roads dimensioned for maximum-length vehicles of the size of one sub-element. However, where the load is to be a large rigid body, even independently-steerable sub-elements will not alter the large length of the carried body.

A device adapted for transporting railway cars on streets is disclosed in U.S. Pat. No. 2,058,955—Culemeyer. This device seeks to attach the wheels of the railroad car to individual four wheel bogies, each bogy supporting a short length of rail. In order to mount a railway car on the Culemeyer bogies, the bogies for the front and rear are connected to one another by rail elements in addition to the rail carrier by each bogy, or the unconnected bogies are positioned immediately behind one another, whereby each axle of the railway car may be rolled onto its supporting rail links one at a time. Having been loaded, the railway wheels rest in depressions which tend to position the bogies immediately under the railway wheels. It will be appreciated that the device of Culemeyer is effectively a wheel adaptor which allows steel wheeled railway cars to traverse roads by merely attaching road tires to the axles of the railway car, under the steel wheels. Culemeyer therefore employs the frame and body of the railway car for the necessary rigidity in the vehicle as carried over the roads. Inasmuch as the bogies comprise spring suspensions in addition to the track-rated spring suspensions normally carried by railroad cars, the overall device may be expected to be somewhat unstable and prone to sway if carried at a great speed or over uneven terrain. It will be difficult for a designer using the Culemeyer device to arrive at a resilience in the suspension of the bogies which will provide a stable overall structure when supporting a railway car having its own suspension of unknown attributes.

Culemeyer employs a drawbar-driven steering mechanism for the individual bogies. Rigid linkages attach the drawbar to the bogies on each side of the front axle support, a rotational element of variable length transmitting the steering forces to the rear bogies. The steering mechanism employed is invariable in that whenever the drawbar moves to one side, the front bogies are steered to follow the drawbar and the rear bogies are steered in the opposite direction, whereby the carried vehicle will follow a path having a somewhat tighter turning radius than would otherwise result. The individual bogies are not individually controllable, but rather follow this one steering scheme. It is therefore impossible to cause the trailer to steer under any control other than the drawbar, and impossible to cause the trailer to follow a diagonal path or a complex path.

Various trailers known in the art employ multiple wheel members, wheel members connected to follow complex steering patterns, and vertically-positionable wheel suspensions. In U.S. Pat. No. 3,520,549—DeLay, a semitrailer is equipped with a plurality of steerable axles. Although not driven by a drawbar, the front axles follow the pulling vehicle, and the rear-most axles steer in the direction opposite the front axles. Additional axles located in the mid-section do not steer but remain longitudinally aligned.

U.S. Pat. No. 3,131,950—Weaver, Jr. et al discloses a device for leveling a load passing over uneven terrain. Manually-driven threadable positioning mechanisms are provided for each end of each axle, whereby the user can adjust both the vertical distance between the load-carrying platform and the axles, and the relative angle between the axle and the platform. It will be appreciated that, in order to employ such individually-adjustable means with a drawbar trailer having multiple front and multiple rear axles, some means must be included for adjusting each axle to the same angle and height. If this is not done, the axle which happens to be positioned at the lowest level with respect to the rigid platform will suffer the greatest wear and will in effect carry the other axles.

A variety of devices are known for carrying very large loads. Examples of devices for carrying large loads disclosed in the art include large steel beams (U.S. Pat. No. 4,017,094) and tanks (U.S. Pat. No. 3,191,962). In carrying such large loads, there are various problems in addition to merely increasing the scale of the usual vehicle. Using a larger vehicle does not change the fact that the roads are dimensioned to accommodate smaller vehicles, and of course, the truck or trailer designer cannot avoid the large dimensions of the load.

When the large load to be carried is a vehicle, the problems are compounded. Means must be provided for loading the vehicle onto the trailer. As cranes sufficiently large for such a purpose are quite expensive, it is desirable to roll the vehicle onto the trailer. Once loaded, some provision must be made to secure the vehicle from movement with respect to the trailer. Inasmuch as the carried vehicle has its own suspension, either the resilience of the vehicle's suspension must be accommodated, or some means must be provided to cancel or otherwise secure the vehicle against rocking and swaying.

The present invention is directed to carrying rapid transit subway vehicles, railway cars and the like over streets. This form of transportation may at first seem peculiar, as every city with a rapid transit system is part of a rail network anyway, and the gauge of track is usually the same.

However, the realtively "fine" suspensions of such rapid transit vehicles would be destroyed by even a brief journey on typical railroad freight track. More-over, the couplers of such cars are usually not compatible with typical railroad stock. Use of railroad flatcars is possible, but less practical, as cranes would still be necessary and bridge and tunnel clearances would present difficulties. Passenger cars intended for modern rapid transit systems simply can therefore not be safely or conveniently transported over typical heavy duty, general purpose railroad tracks. This invention therefore allows such rapid transit vehicles to be transported from a manufacturing facility, even one without a rail siding, or from one passenger railroad system, to another passenger railroad system, over the roads.

The invention, however, departs from the prior art by employing a plurality of front and rear axles which are not only steerable according to a regime intended to reduce the turning radius of the trailer, but in addition, by employing axles which are independently controllable by manual controls disposed at convenient locations around the trailer. Accordingly, the trailer can be effectively parallel parked by diagonal movements, adapted to follow a predetermined steering radius by independently steering only the front or only the rear axles, or locked in stable non-steering position to efficiently traverse straight road sections. In this way, the trailer can be aligned with a section of track with relative ease.

The invention comprises movable means for raising and lowering any portion of the trailer platform with respect to any other portion, the means being a fluid-driven inter-related means which permits an entire side of the trailer to be subject to the same control, or the entire front or entire rear thereof. With such means, the trailer may be tilted to an inclined plane for receiving the railway vehicle, which is merely pushed and/or drawn onto the trailer. In order to traverse banked turns which are designed for smaller vehicles, traveling at higher speed, the trailer platform is transversely positionable at selected heights, whereby the platform may be held level, or in an orientation which is substantially closer to level, while the axles are sloped. Each of these functions is controllable either manually or automatically.

The suspension of the carried vehicle is effective only during loading and unloading. Although the wheels of the carried vehicle remain in contact with the platform, the body of the carried vehicle is engaged by movable support means which may be pivoted into position under the body of the carried vehicle. Most often, rapid transit vehicles are themselves provided with vertically-positionable bodies, whereby the vehicle may be raised on its suspension, the supporting members may be positioned and the carried vehicle lowered thereupon. This procedure securely locks the body of the carried vehicle to the trailer, and eliminates any destabilizing effect which might otherwise result from the effect of the suspension of the carried vehicle.

The invention is also useful in carrying other kinds of very long, very heavy loads, such as liquid and gas storage tanks, construction beams and others.

SUMMARY OF THE INVENTION

It is an object of the invention to provide improved means for transporting very long, very heavy, substantially rigid loads over streets and highways.

It is a further object of the invention to provide a convenient means for efficiently carrying rapid transit subway cars and other large railroad vehicles over streets.

It is yet another object of the invention to provide a versatile mechanism for independently steering the wheels of a drawbar trailer, permitting a range of different motions and attitudes.

It is still another object of the invention to prevent instability in a vehicle-carrying vehicle due to the compound effects of the suspensions of the carried vehicle and carrying vehicle.

It is still another object of the invention to provide a versatile trailer which may be powered from conventional power sources in conventional tractors.

A drawbar trailer for transporting very long, very heavy, substantially rigid loads, the trailer having a load support platform carried by at least one front and at least one rear axle and separable wheel assembly, the trailer comprising: an adjustable suspension system having inflatable members disposed between the platform and the front and rear axles for selectively raising and lowering the front and rear of the platform and for selectively raising and lowering the sides of the platform; the drawbar being pivotably mounted to the platform about a substantially vertical axis; a mechanism which may be hydraulically power assisted, for turning the wheels of at least one of the front and rear axle and wheel assemblies; an automatic control system for activating the turning mechanism in response to pivotal movements of the drawbar; and, members for securing the load to the platform, whereby the tilt axes of the load support platform can be adjusted with respect to the axle and wheel assemblies, and in turn, with respect to terrain features. In the presently preferred embodiment, the drawbar trailer is particularly adapted for transporting rapid transit subway cars, railcars and like vehicles having internal suspension systems. Such a specially adapted drawbar trailer further comprises support members for holding and immobilizing the bodies of the carried vehicles with respect to the platform, preventing movement of the vehicle bodies on their internal suspension systems. The load support platform may be inclined about its tilt axes to facilitate loading, carrying and unloading the carried vehicle and the trailer can be maneuvered as easily as smaller trailers. It is also presently preferred that the trailer comprise three front and three rear axle and steerable wheel assemblies, both the front and rear sets of axle and wheel assemblies being controlled by hydraulically assisted steering mechanism. The drawbar trailer further comprises a control system for manually activating and controlling the hydraulic power assist system, whereby the trailer may be precisely maneuvered in small spaces.

BRIEF DESCRIPTION OF THE DRAWINGS

There are shown in the drawings the embodiments which are presently preferred. It should be understood, however, that the invention is not limited to the precise arrangements and instrumentalities shown.

DETAILED DESCRIPTION OF THE PREFERRED EMBODIMENTS

Figure 1:
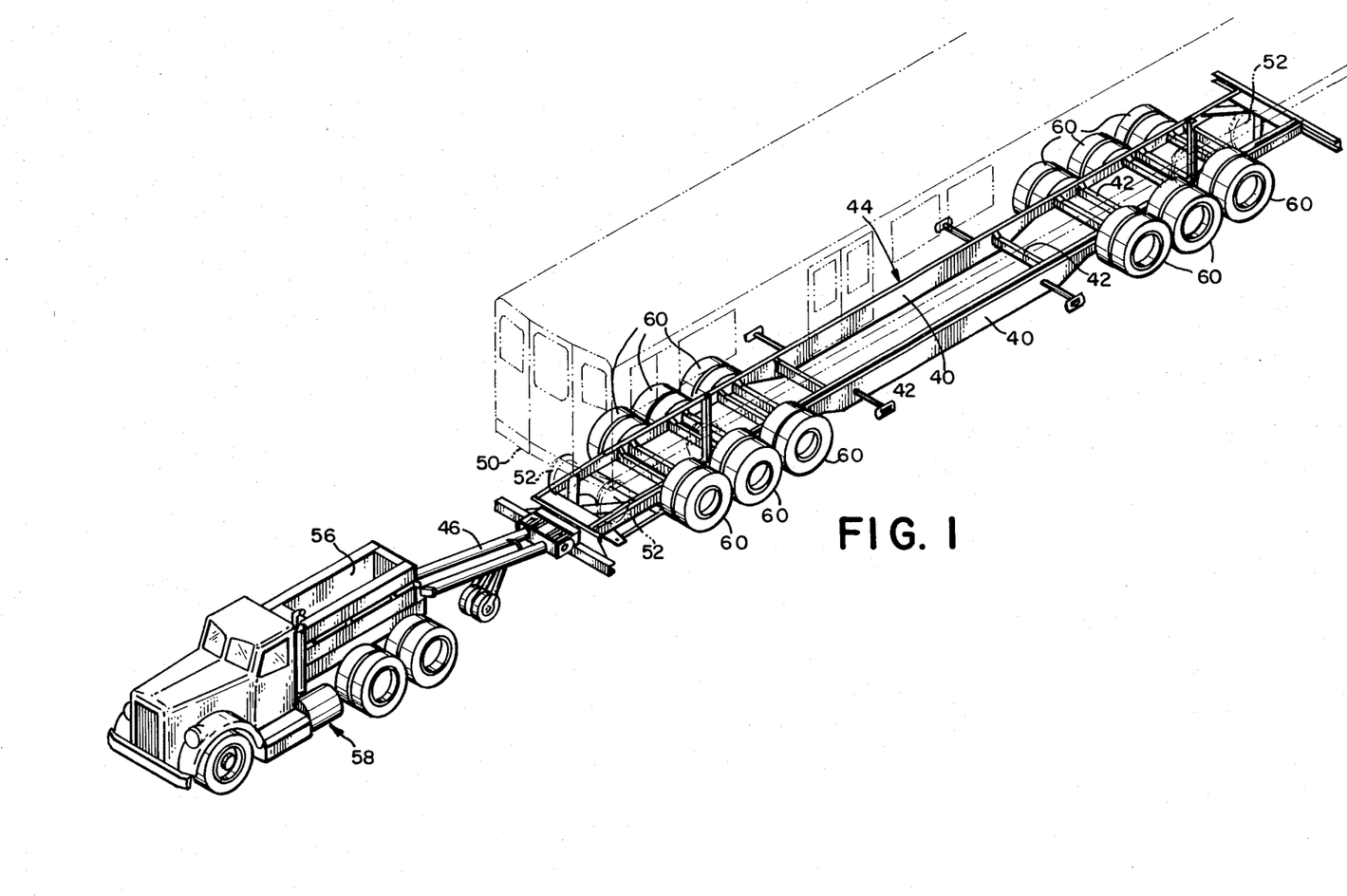
FIG. 1 is a perspective view of the trailer of the invention, the carried railroad car shown in dotted lines.

In the embodiment illustrated in FIG. 1, the invention is adapted to carry rapid transit subway cars, and other such railroad cars having steel rail-engaging wheels, over roads. Accordingly, the invention is intended to both support the railroad car on the more-appropriate resilient inflatable tires which are common to road vehicles, and to facilitate loading and unloading the railroad cars.

Railroad cars, are, of course, a great deal larger than conventional road-traversing vehicles. One approach to the need for such a vehicle would be to merely enlarge the design of known trailers. Such an approach would be unduly expensive in that custom made parts would be required in many parts of the apparatus. An oversized pulling vehicle would also be required. Even having achieved such an oversize made-to-scale vehicle, the user would find that the vehicle was not adapted for use on roads, the turning radius being too long, and various other dimensions exceeding the maximum for which roadways are currently designed.

Generally speaking, the present invention employs parts which are of large, although standard dimensions and manufacture. A pair of heavy duty supporting rails 40, 40 are attached to cross members 42 at a plurality of locations, forming a platform 44 for supporting a railroad car 50, shown in phantom. The railroad car, of course, is designed to traverse steel rails, by means of steel wheels 52, which are flanged along one side to engage conventional railroad tracks. Inasmuch as the railroad car 50 is a vehicle intended to operate relatively independently when positioned on rails, wheels 52 are attached to car 50 by means of a resilient suspension. Similarly, platform 44 of the trailer is mounted to and supported upon trailer wheels 60 by means of a resilient suspension. The entire arrangement is drawn by pulling vehicle 58, attached to the trailer by means of drawbar 46. Drawbar 46 is vertically freely pivotable. However, horizontal pivotal movement of drawbar 46 operates one of several kinds of mechanisms which cause the wheels 60 of the trailer to turn for steering assistance. A weight 56 is placed on pulling vehicle 58, in order to improve the pulling vehicle's traction during starting and stopping. In addition to the basic features noted, and as will be described more fully hereinafter, platform 44 is selectively vertically-adjustable, front and rear and side to side, with respect to trailer wheels 60 and their axles 62 at each junction point. The wheels of each trailer axle 62 are steerable, although each is attached to a suspension connected to the trailer platform 44. At convenient locations, manual control means are provided whereby some or all of the trailer wheels 60 may be steered for precise tight maneuvering, as in aligning the trailer with a railroad yard spur track.

Figure 2:
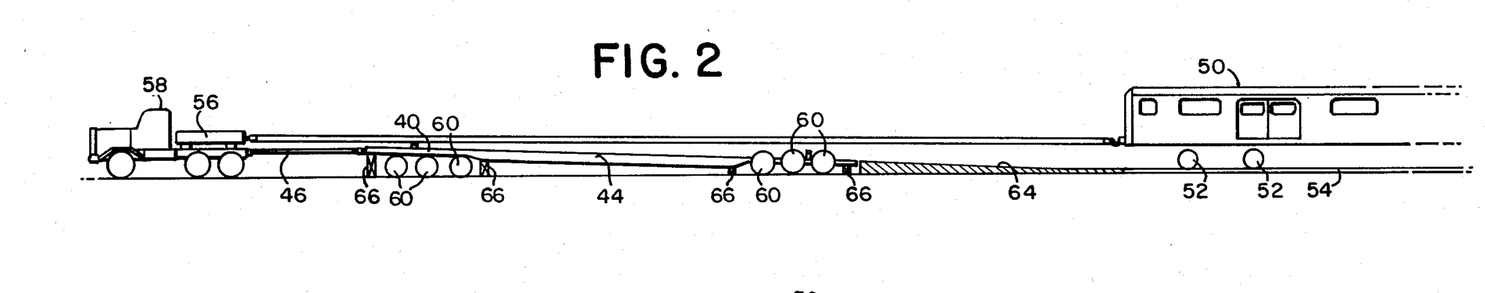
FIG. 2 is a schematic elevation view of the trailer being loaded.
Figure 3:
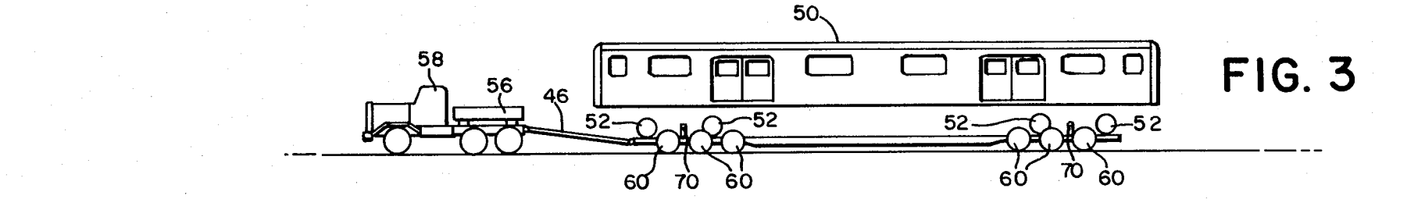
FIGS. 3 and 4 are side elevations showing respective steps in securing the carried vehicle to the trailer.
Figure 4:
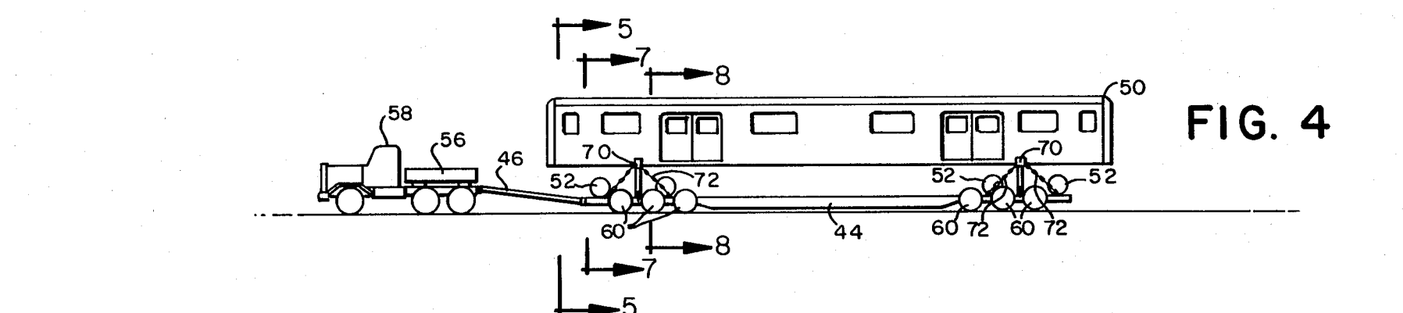

Initially, the railroad car must be mounted on the trailer. With reference to FIGS. 2, 3 and 4, the trailer is first tilted in a front-up, rear-down inclination, to align one end of rails 40 with an inclined plane 64, the inclined plate 64 being a terminal member of a section of railroad track 54. In order to prevent any drop off due to the sudden placement of the load (in this case the railroad car) on the resilient suspension of the trailer, rigid support blocks or jacks 66 are preferably positioned under the trailer platform 44 at various locations. Support blocks 66 may be collapsible members, as shown in FIG. 2, adapted to be stowed along the platform of the trailer, or in the pulling vehicle. Alternatively, support legs pivotally attached to the underside of the trailer can be provided at spaced points, pivotable downwards to rest in vertical position under the trailer when needed for support, and pivotable upwards, horizontally, when not in use.

A range of angular front and rear angles of tilt is provided in the trailer platform by means of the fact that extension of the suspension between wheels 60 and platform 44 is independently operable at the front and rear. Accordingly, the entire trailer platform 44 may be raised while held horizontal with respect to the ground, or lowered, or tilted as shown in FIG. 2.

Drawbar 46 attaches the trailer to a pulling vehicle. A winch is also provided either on the railroad car 50, or on the pulling vehicle 58, whereby the railroad car 50 may be drawn (or may draw itself) up inclined plane 64 and onto trailer platform 44. At this point, the blocks 66 may be removed and the trailer horizontally positioned. In general, the vertical positioning of the platform with respect to the wheels and/or axles is accomplished by inflating and deflating one or more expansible compressed air driven members.

With reference to FIGS. 3 and 4, having rolled trailer 50 onto platform 44, the user is not ready to merely drive off. Inasmuch as trailer 50 is mounted on a resilient suspension over its wheels, and platform 44 is mounted on a resilient suspension of its own, the two suspensions will tend to form a relatively-unstable overall support for railroad car 50. Each suspension will have a certain resonant frequency, and the sum of the resonances of the two suspensions will also have a certain resonant frequency. In summing these resonances, the load will be unstable at a plurality of separate resonant frequencies which frequencies may be encountered, for example, while cruising over regularly-spaced concrete slabs on the highway.

In precisely aligning the long, drawbar-attached trailer platform 44 to a loading spur, the driver of vehicle 58 would have a realitvely complex job. Steering drawbar type trailers in reverse is especially difficult. According to the invention, however, the wheels of the front and rear axle groups, and each of the axles in such groups, are individually steerable. In this manner, the user may manually and/or automatically steer the trailer around curves or even at a diagonal, assisting the driver of the pulling vehicle in aligning the trailer and the track.

In continuing the process of loading the railroad car 50 onto trailer platform 44, and with reference to FIGS. 3 and 4, after car 50 has been moved onto platform 44, car 50 is raised on its suspension, that is, the body of the railroad car is raised with reference to the wheels 52. This may be accomplished, for example, by inflating suspension members of the railroad car, or if necessary, for example, raising the car on jacks. In any event, the body of the railroad car having been lifted slightly with respect to wheels 52, and therefore with respect to platform 44, pivotable support members 70 can be moved into position. The body of railroad car 50 is then lowered back down upon the supports 70, thereby securing the railroad car 50 against movement relative to platform 44, and freeing the overall structure from any influence due to the resilience of the railroad car suspension. Pivoting support 70 may be further secured by means of chains 72 or the like, and chocks may be positioned on either side of railroad wheels 52, to preclude any rolling motion.

Figure 5:
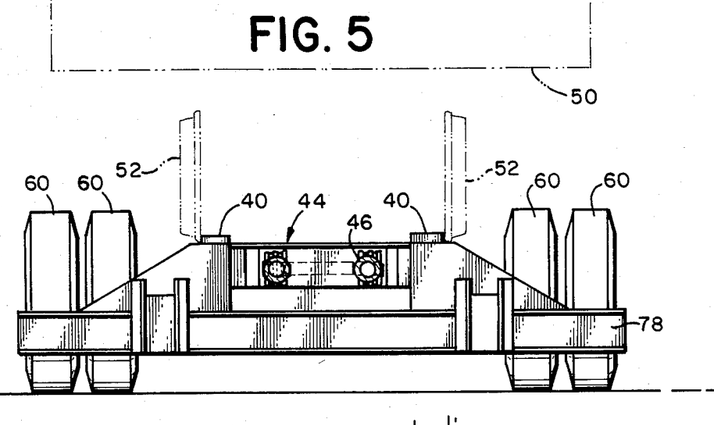
FIG. 5 is a section view taken along line 5—5 in FIG. 4.

FIG. 5 shows the particulars by which the railroad car 50 rides on trailer platform 44. Rail members 40 are preferably placed inside steel wheels 52. It will be appreciated that wheels 52 are riding on their extending rims, rather than upon the wider flat areas, as they would ride in use. Inasmuch as most of the weight of the railroad car body is supported by support members 70 (See FIG. 4), wheels 52 may be rested upon their edges without damage. Rail members 40 can also be positioned such that wheels 52 ride normally, not on the flanges.

As is conventional in heavy duty trailers, the trailer wheels 60 are placed two on each end of each axle. Given six axles, three at the front and three at the rear, the trailer has twenty-four wheels engaging the roadway. The use of multiple conventional-sized wheels rather than a smaller number of larger wheels, tends to accomplish the object of supporting the railroad car without the undue expense of custom fittings.

It is presently preferred that conventional sized axles also be used, however, in order to span the usual railway car, the "gauge" of the axles must be increased (lengthened). This is done by inserting a spacer in the conventional steerable axle.

Figure 6:
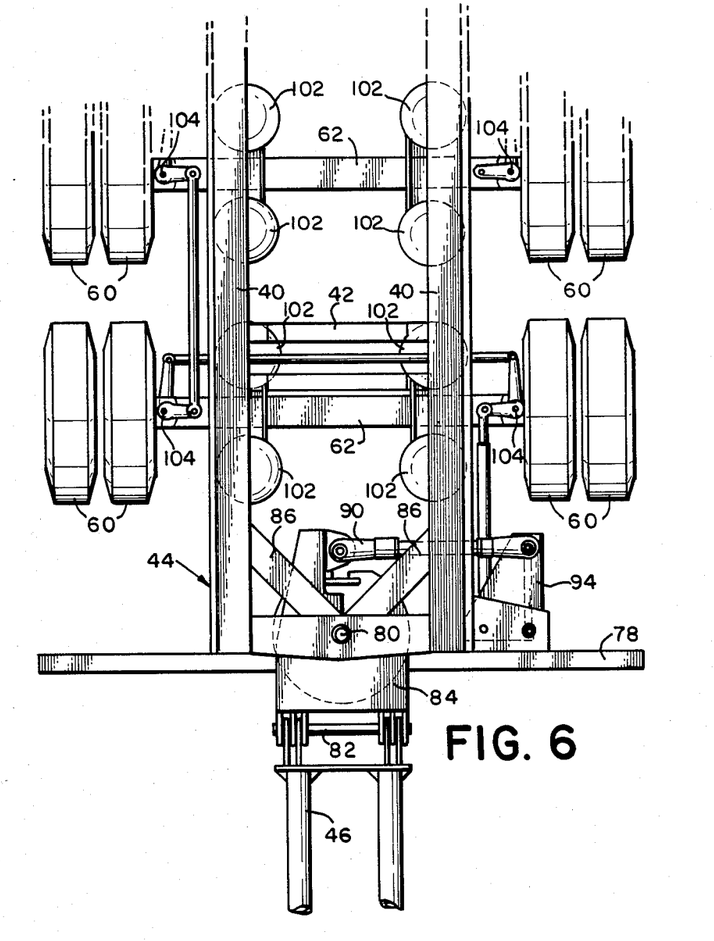
FIG. 6 is a partial plan view of the section of the trailer shown in FIG. 5.

Referring to FIG. 6, the general construction of the trailer comprises, in addition to longitudinal rail members 40, connected by cross members 42, a full width horizontal member 78 extending across the front of the platform, and supporting the mounting for drawbar 46. Drawbar 46 is vertically movable about a horizontally disposed pivot 82, which horizontal axis pivot is an extension of a pivotable support block 84 which pivots around pin 80, defining a vertical axis. Vertical axis pin 80 is securely affixed to the frame forming trailer platform 44, by means of diagonal braces 86. The extent of pivot around vertical axis 80 effectuates control by connecting arm 90, which may include an hydraulic valve (see value 140 in FIG. 15). Connecting arm 90 connects an extension 92 of block 84 to a pivotable member 94, mounted to rotate with respect to pin 96 in platform 44, and operable to effect steering.

Rail members 40 are shaped substantially like boxes in cross section, having horizontally-disposed supporting surfaces on the outer edges thereof, for supporting wheels 52 by the rims of their flanges.

Pivoting block 84 and connecting member 90 can form part of the steering linkage controlling the front three-axle set of trailer wheels. Several alternative embodiments of such steering mechanisms are disclosed hereinafter in which the drawbar, by its linkages, is operable to set the angular position of trailer wheels 60 around each of the steering pivots 104.

Each axle 62 is supported by at least one air bag 102 which is extensible under the influence of compressed air. It is presently preferred that four such bags 102 be provided for each axle, whereby no single bag is particularly stressed. In order to accomplish front to rear and side to side tilts of the platform 44 over the wheels, it is necessary to have at least two air bags per axle, namely one on each end of each axle, positioned approximately beneath each rail 40. In this manner, all of the left side or all of the right side air bags can be inflated or deflated to cause a side-to-side tilt, and each of the front or rear bags can be inflated or deflated with respect to the other end of the trailer, in order to accomplish a front to rear tilt.

Figure 7:
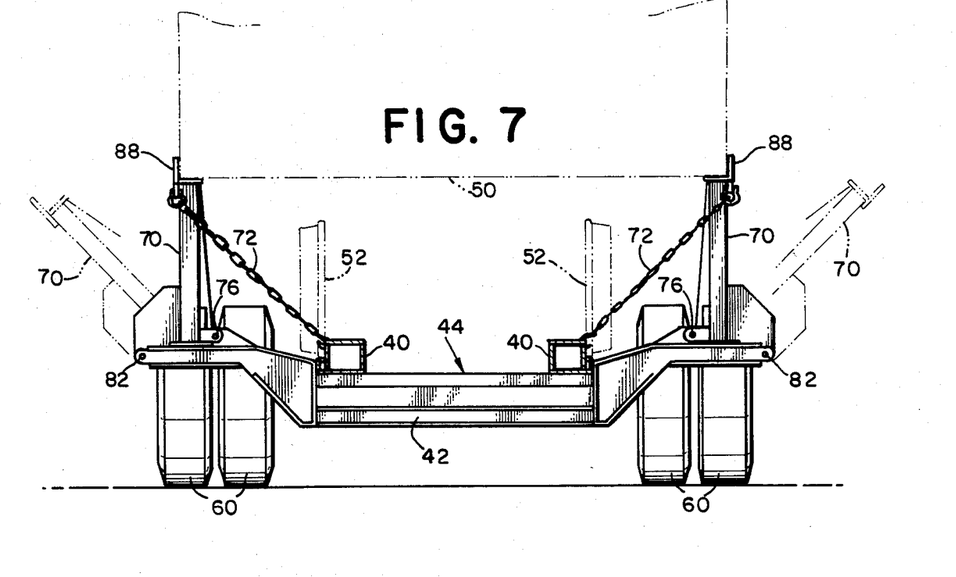
FIG. 7 is a section view taken along lines 7—7 in FIG. 4.

FIG. 7 is a section view taken slightly rearwardly of the view of FIG. 5. As shown in FIG. 7, the side supporting members 70 pivot up to engage the lower outermost corners of the body of railroad car 50, securing it against any rocking on its own suspension. The pivotable support member 70 can be secured to rails 40 of platform 44, or to other convenient locations which will ensure that supports 70 remain pivoted upwards against the railroad car body. In their inoperative position, supports 70 are shown in FIG. 7 in phantom, and shown in solid lines in their operating positions. It will be appreciated that supports 70 may be locked in their upward positions by inserting pins 76 into the appropriate locking holes. In this manner, supports 70, which pivot around pivot pins 82, may be further secured against the body of railroad car 50. A suitable bracket or cushioned corner-engaging member 88 may be affixed at the end of supports 70, for engaging the railroad car body.

Figure 8:
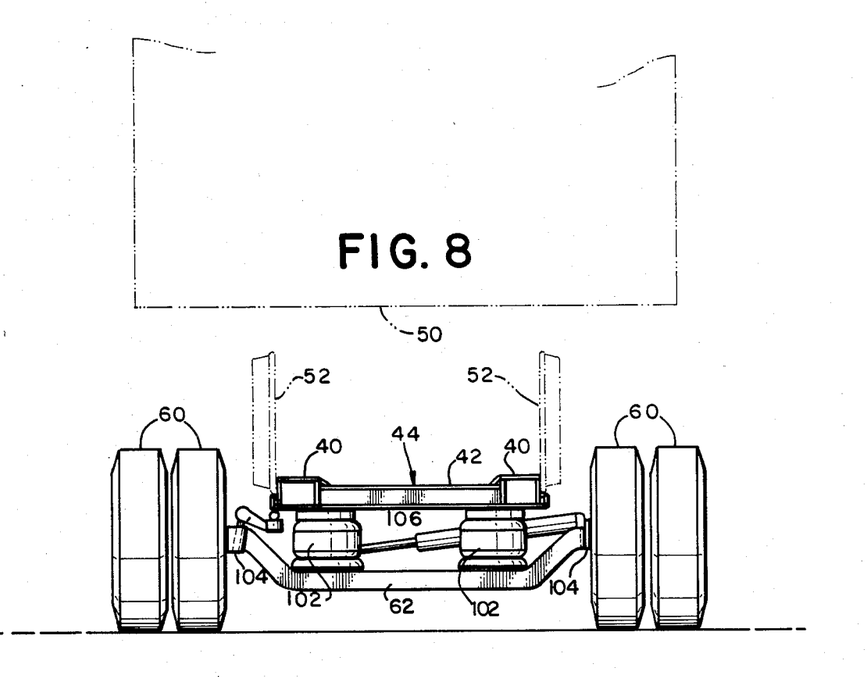
FIG. 8 is a section view taken along lines 8—8 in FIG. 4.

FIG. 8 is another section view, taken from immediately behind supports 70, shown in FIG. 7. As can be seen, axles 62 are not strictly straight members extending horizontally from wheel to wheel. As is known in connection with steerable axles, the axle includes a shallow U-shaped crossmember upon which rest the suspension members, in particular air bags 102. At either side of axle 62, a pivot 104 is provided for positioning the steerable wheels 60 as desired. The two wheels attached in each pair are rigidly affixed to the same body which may be adjustably positioned around pivot 104, for example, by means of steering assist hydraulic cylinder 106.

Figures 9, 10A, 10B, 11A, 11B:
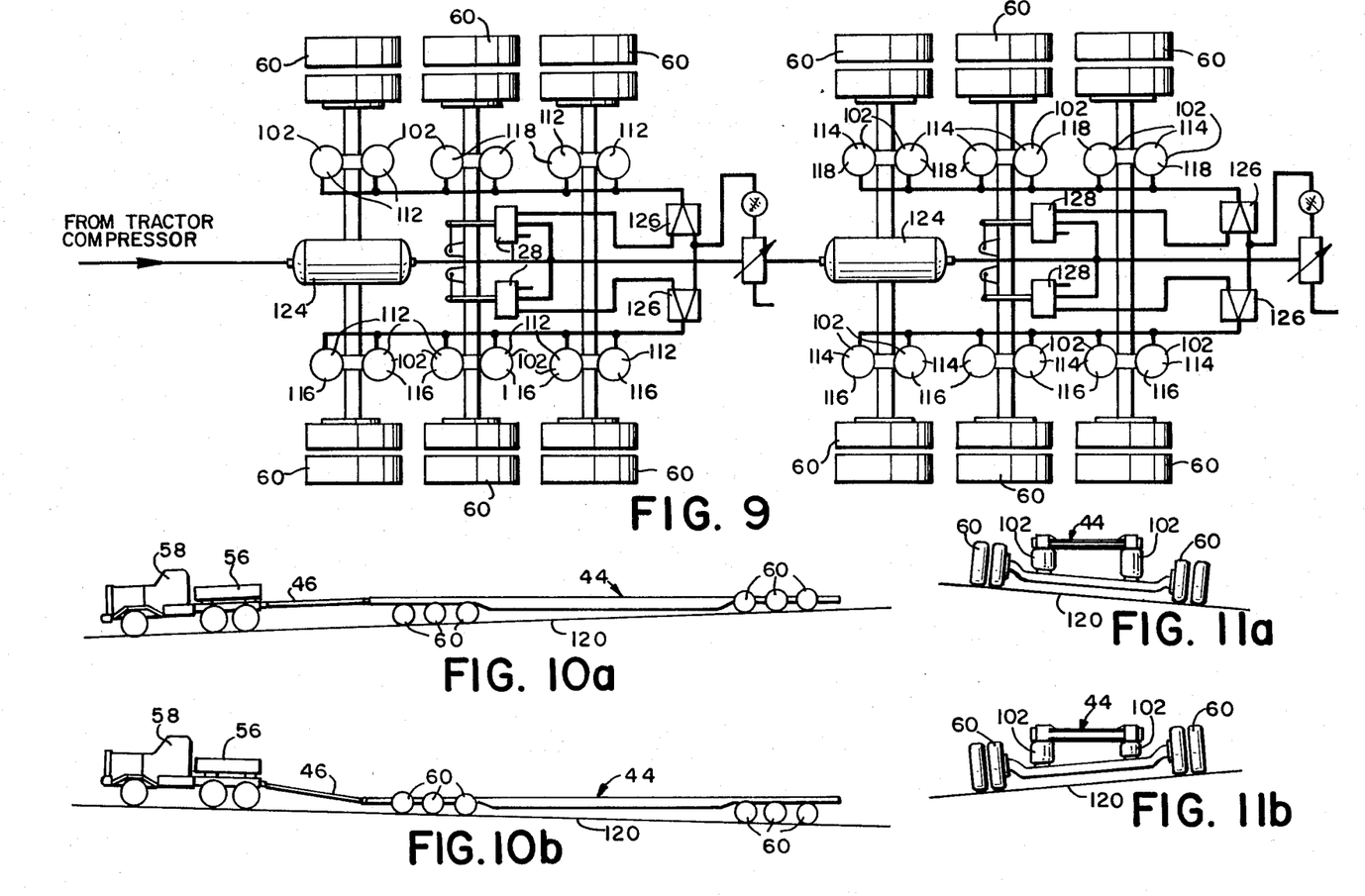
FIG. 9 is a schematic view illustrating the compressed air system of the trailer.
FIGS. 10a and 10b demonstrate fore and aft tilting of the trailer.
FIGS. 11a and 11b demonstrate side-to-side tilting of the trailer.

FIG. 9 shows the preferred control and valving for operation of the selectable tilt mechanism. The respective positionings available from the device are shown in FIGS. 10(a) and 10(b), 11(a) and 11(b), as well as FIGS. 2 and 3. In usual position (FIGS. 3 and 4), the air bags 102 are each equally inflated, whereby the trailer platform 44 remains horizontal when running over horizontal terrain. In order to distinguish between front and rear, and left and right air bags 102 (which are identical), multiple reference numerals are utilized. In loading, as illustrated in FIGS. 2 and 10(a), the front of platform 44 is raised and the rear is lowered. This operation requires that all the front inflatable bodies 112 be inflated more than rear inflatable bodies 114. Should the required tilt be reversed, for example to maintain a horizontal platform 42 while moving uphill as shown in FIG. 10(b), then the inflation/deflation is, of course, reversed. Similarly, to traverse a banked portion of roadway, at a speed lower than for which the bank was designed, platform 44 may be positioned horizontally even though roadway 120 is banked, by selectively over-inflating or under-inflating all the left air bags 116 or right air bags 118, depending on the tilt direction needed. Such selective operation is provided by opening or closing the selected valves. As shown in FIG. 9, the front and rear wheel groups each have separate air storage tanks 124, directional control valves 126, and control mechanisms 128. The front and rear systems are identical, and each of the front and rear systems is symmetrically identical for the left and right sides. Accordingly, there are four separately controllable zones of inflation and deflation. It will be appreciated that although each of the inflatable members in any of the four groups is equally inflated during side-to-side tilting, the inflation of such members during fore-and-aft tilting is not exactly equal, but instead reflects the tilt of the trailer platform.

Figure 12:
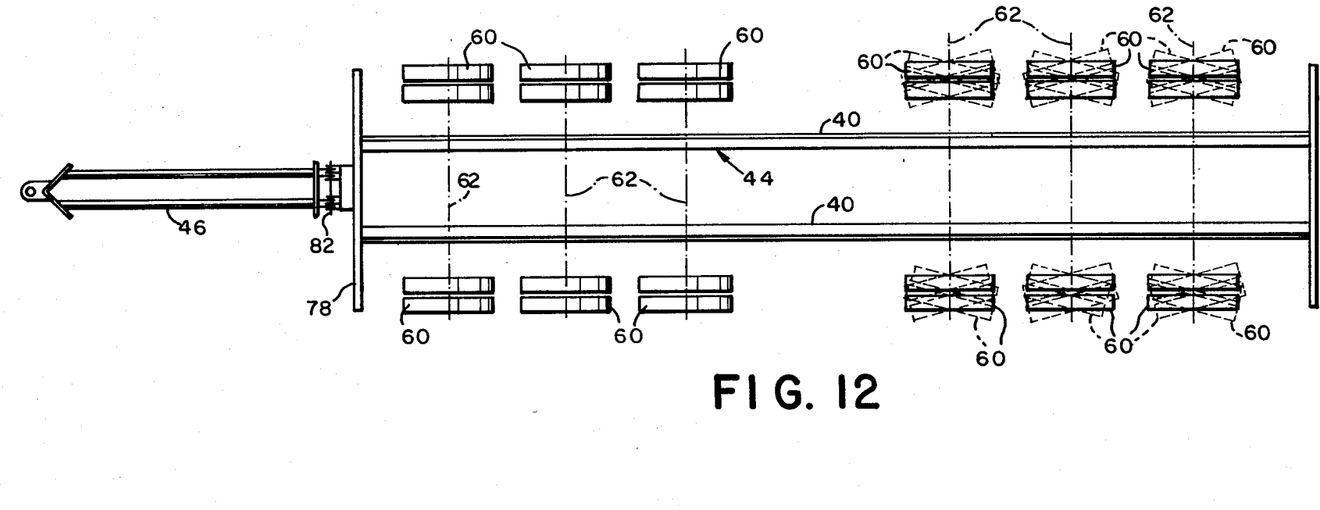
FIG. 12 is a schematic view demonstrating partially-independent steering according to the invention.
Figure 13:
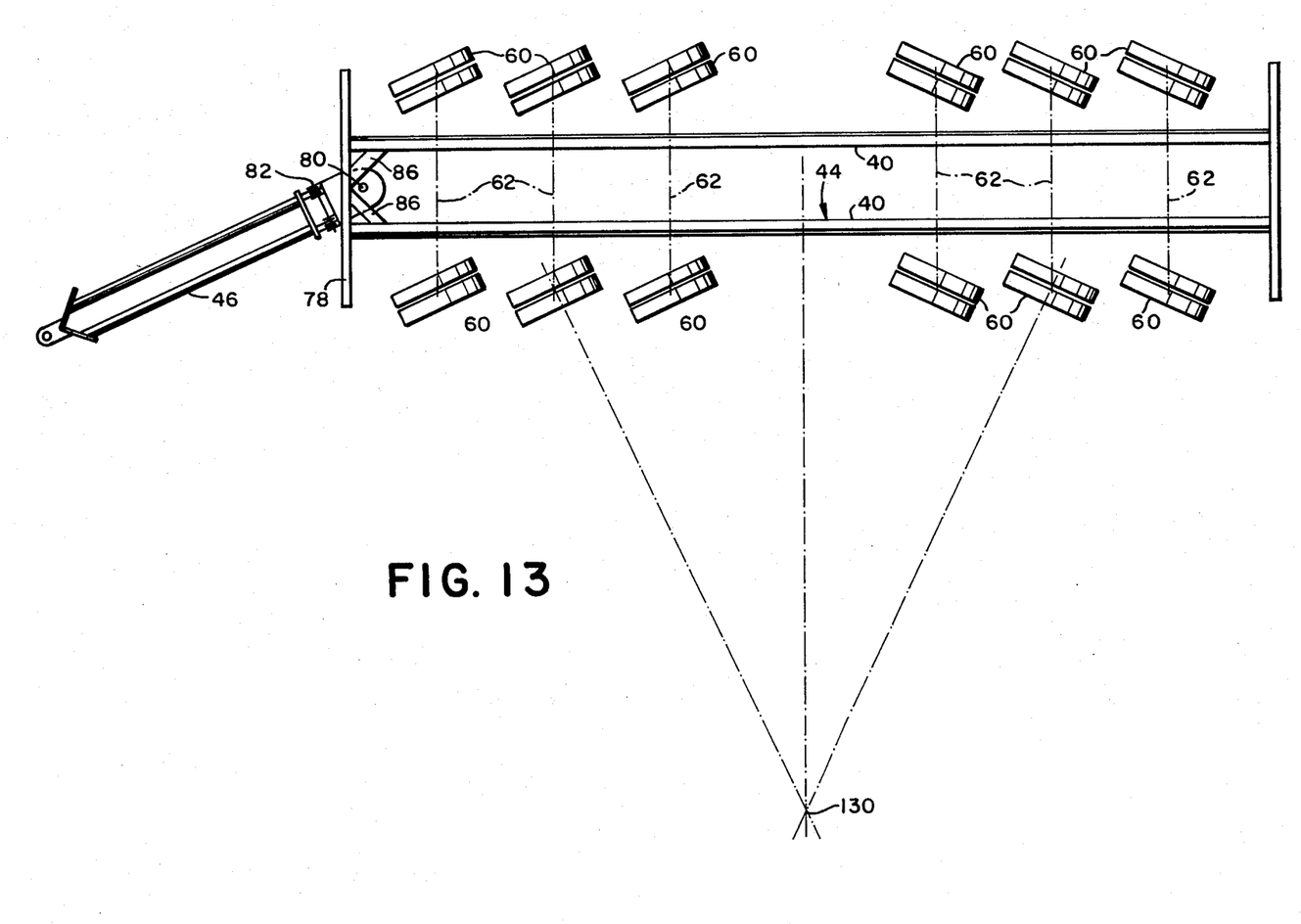
FIG. 13 is a schematic view demonstrating minimum turning radius steering.
Figure 14:
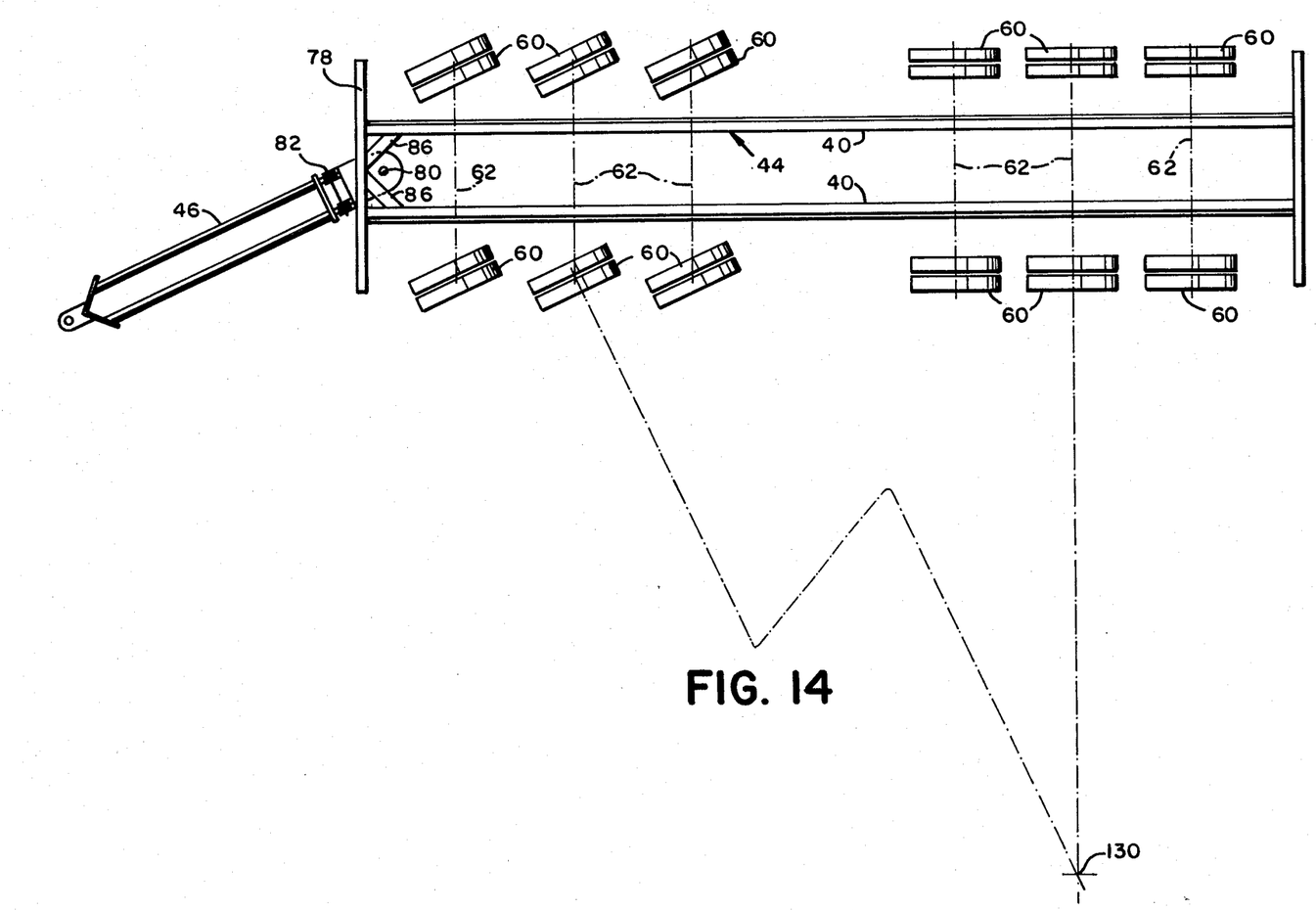
FIG. 14 is a schematic view illustrating diverse turning radii.

In addition to control of the relative tilt of the axles and trailer platform in both front-and-rear and side-to-side directions, the trailer wheels according to this invention are individually steerable. Both functions, tilt and steering, are alternatively controllable from a manual station. Accordingly, an operator positioned at the manual station can control tilt and steering while in close proximity to the trailer. This is the preferred method for traversing tight curves, banked roadways, loading, unloading and other such problem situations. Conventional vehicles traversing curves, banks or such areas are able to do so at the higher speed for which the roadway was designed, and have no difficulty in traversing the standard radii of curvature thereof. The oversized and very-long load intended for the invention, however, requires that such portions be traversed slowly, whereby any design benefits of banked curves and the like are lost, and whereby special provision must be made for allowing the overlength trailer to traverse a tight curve while remaining on the roadway itself. With reference to FIG. 12, the necessary steering may be accomplished by embodying the rear set of axles to be independently steerable, or as shown in FIG. 14, the front set of axles, or as shown in FIG. 13, both sets of axles. The effect of individually steering the trailer wheels is to alter the turning radius of the trailer. Should all the axles remain immovably aligned in a longitudinal direction, it would be necessary in turning the trailer to force the wheels at an angle displaced from the direction of rolling, against the force of friction. In the conventional semi-trailer, only one set of axles is provided. In a drawbar trailer, it is necessary to employ at least one set of steerable wheels, in order to avoid excessive wear on the tires, poor handling and other associated problems.

The rolling direction for each of the wheels is tangent to the arc described by the trailer in turning. As shown in FIG. 14, the trailer will follow an arc having a radius located by the intersection of the perpendiculars of such tangents, for the front axles and the rear axles, respectively. In FIG. 14, the rear axles are aligned to the trailer and the front axles are aligned to steer to the left. The trailer will therefore move in a circular arc around point 130. Should the front wheels be aligned to steer more tightly to the left, the displacement of point 130 from the trailer will be reduced, and the turn made tighter. As shown in FIG. 13, the intersection of the radii defined by the front and rear wheels can be moved closer to the trailer by steering both sets of wheels.

The invention contemplates selectively steering the front axles, the rear axles, or both axles, in order to selectably adjust the turning radius of the trailer for different conditions. For example, on the open road, it will normally be adequate to steer one set of axles, leaving the other set locked in a longitudinally-aligned direction. For slower, tighter maneuvering, both sets of axles can be steered to reduce the trailer's turning radius. In addition, however, the preferred embodiment of the invention includes the capability of manually controlling steering such that the turning radii applicable to the front wheel group and rear wheel group do not intersect. In particular, both the front and rear axles can selectably be steered in the same direction (e.g., left or right), whereby the trailer can be diagonally moved, crab-wise, into or out of a confined location.

Figure 15:
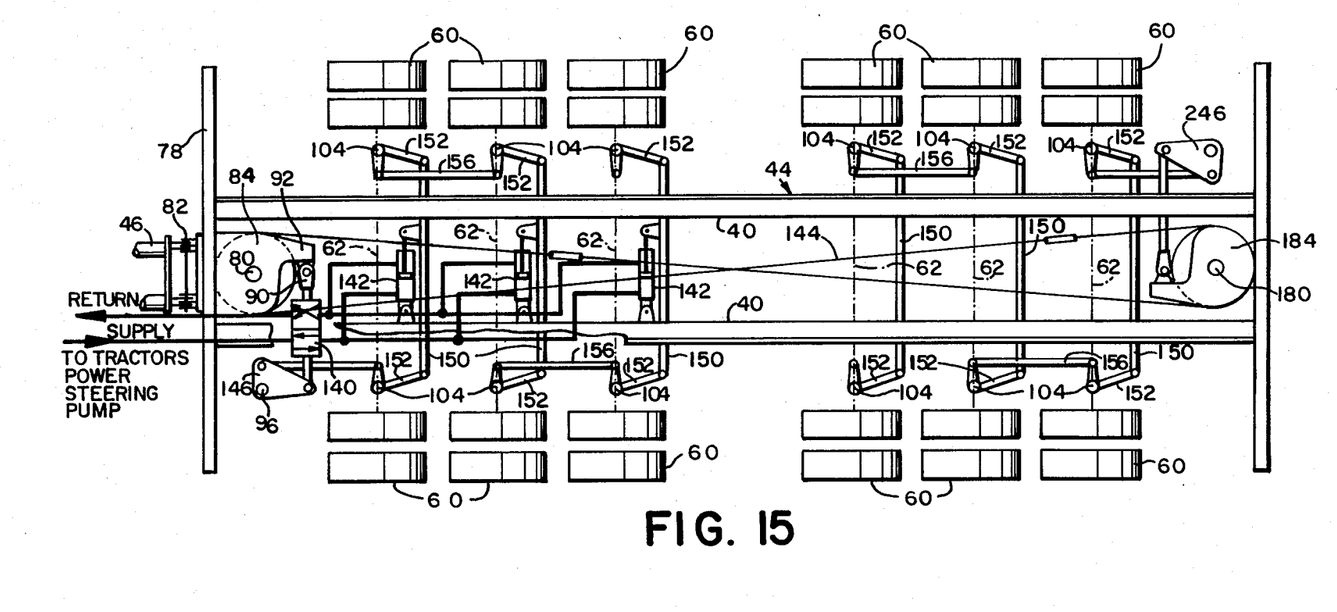
FIG. 15 is a schematic view illustrating a hydraulic power-assisted steering scheme according to the invention.
Figure 16:
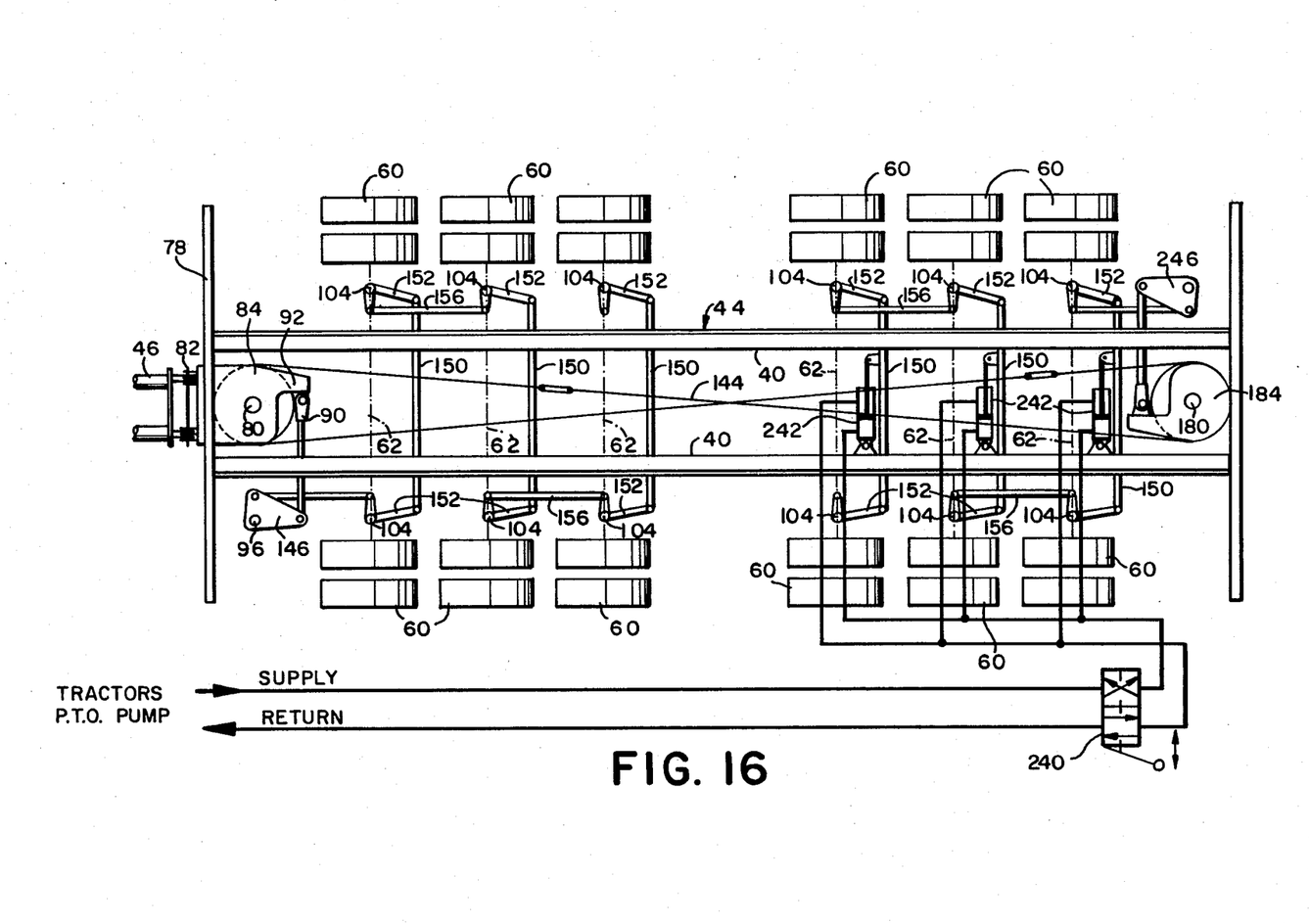
FIG. 16 is an alternative embodiment demonstrating power-assisted independent steering.
Figure 17:
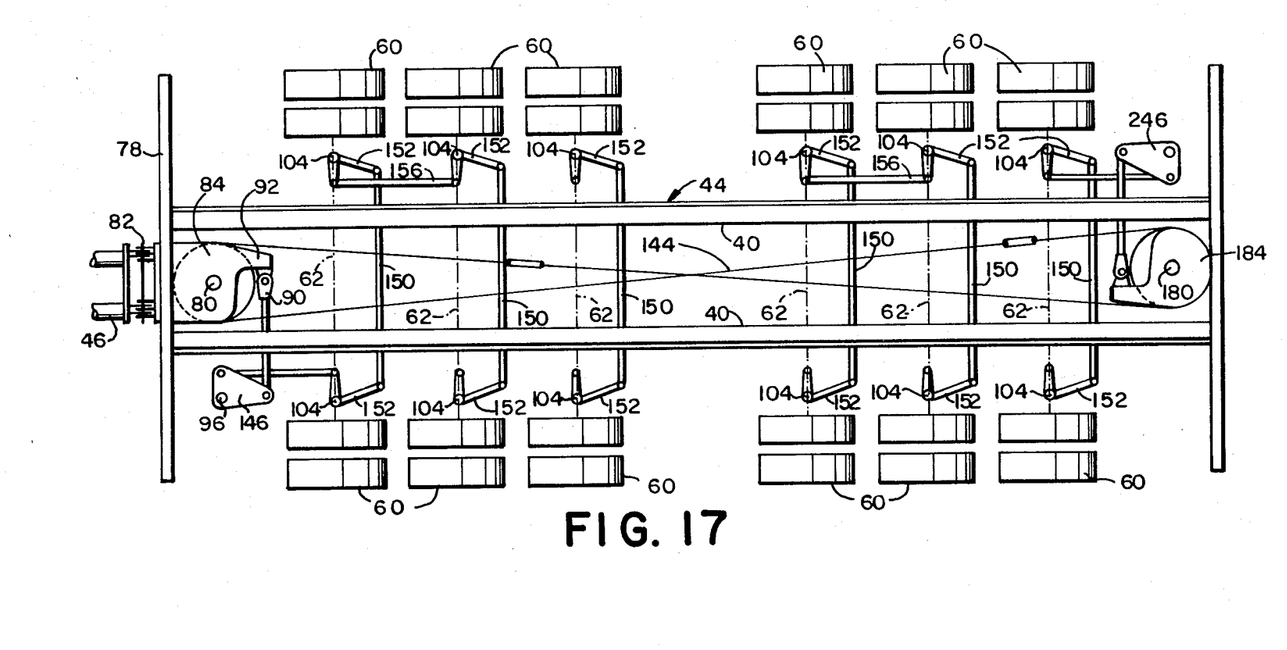
FIG. 17 is a schematic view illustrating an embodiment of the invention driven by mechanical linkages.

The particulars of the steering arrangement are shown in FIGS. 15, 16 and 17. With reference to FIG. 15, a hydraulically-assisted steering mechanism is provided by disposing hydraulic cylinders on the linkages for steering the front (and/or rear) axles. Motion of the drawbar in pivoting around a vertically-oriented axis 80 as the trailer is drawn causes the hydraulic valve 140 to be selectively positioned at a point in its range directing the appropriate hydraulic pressure to power steering cylinders 142, disposed at each axle. Hydraulic valve 140 is merely disposed on the mechanical linkage comprising connecting links from pivoting drawbar block 84 to the auxiliary pivoting member 146. Member 146 is then connected via a linkage to the vertically-pivoting steerable mount of the left front wheel. In alternating fashion, the mechanical force of pivoting drawbar block 84 is conveyed across the trailer to the opposite wheel on the same axle, then rearward to the following axle, across, rearward and across, causing the front (and/or rear) axles to steer in unison. Valve 140, in operating power steering cylinders 142, assists in the mechanically-transmitted motion.

With further reference to FIG. 15, and in particular the rear axles of the trailer shown therein, it is also possible to transmit the mechanical force of pivoting block 84 by an entirely-mechanical scheme. In so doing, the device is identical to that shown for the front axles, with the exception that the power steering assist cylinders 142 are omitted. By means of cable 144, a rotation of drawbar block 84 around pivot 80 is conveyed to rear block 184 around pivot 180, and thereafter via linkages to auxiliary pivot 246, and to each of the pivotable steering axes for each axle. Provision of two drawbar blocks 84, 184 which are formed as pulleys, connected to one another by cable 144, renders the entire trailer reversible, as the drawbar 46 can be connected to either drawbar block 84, 184. This eliminates the need, if otherwise necessary, to turn the trailer around. The tilt and steering control system are of course also "reversible".

The power steering assist hydraulic system may be driven from the pulling vehicle's power steering pump, as provided by FIG. 15. Alternatively, or in addition, the power takeoff hydraulic pump available from the transmissions of such pulling vehicles may be employed, as provided by FIG. 16. In FIG. 16, a power steering assist device similar to that disclosed for the front axles in FIG. 15 is employed. Hydraulic cylinders 242, mounted by one end to the trailer body, and by an opposite end to the linkage controlling steering of the wheels are operable under control of manual valve 240 which may be employed instead of, or in addition to valve 140 for the front axles. It is presently preferred that power steering assist cylinders be installed on each of the axles. Front axle steering is made automatically operable under influence of forces exerted by the drawbar in moving the trailer. Rear axle steering is accomplished by an identical system connected to the rear pivotable block 184, connected by cable to front block 84, to operate opposite the front block. Manual control of the front and/or rear is used in addition, for example, during the traverse of banked turns, tight turns, loading and the like.

The specific linkages connected to cause simultaneous positioning of each of the wheels in a set may be considered as identical building block units. Linkage members 152 which run from left to right across the same axle cause both the left and right wheels to be aimed to the same angle. Linkage cross members 150 are pivotably attached to an end of lever arm linkage members 152. Members 152 are rigidly attached to the wheel mounting means, whereby rotation of lever arms 152 around pivot 70 causes the wheels to also rotate around pivot 70, thereby being steered. Short connecting arms 156, also rigidly connected to the wheel mounts, transmit or receive a longitudinal force having its basis in the drawbar, or in one of the other axles. The hydraulic power assist which is appended to the linkage need be only a valve-controlled hydraulic cylinder which is operative to force linkage cross members 150 to one side or the other, causing the wheels to align in response.

It will be appreciated that manual steering can be accomplished only with hydraulic or other power assist. Where powered steering at one end is linked to mechanical steering at the other end, as in FIG. 16, the mechanical link, in this case cable 144, must first be loosened or released, in order to provide freedom of movement to the manually steerable wheels. Means to effectuate such loosening or releasing are well known in the art. At the very least, turnbuckles on the cable could be loosened.

Various components which make up the trailer of the invention are available on the market, albeit for other applications. The power steering assist units and steerable axles are substantially the same as steerable axles used in the front wheels of semi-trailer tractors. The mountings and linkages with which the axles are attached to the platform of the trailer may be heavy duty versions of such parts as applied to semi-trailer tractors. The axles may be lengthened by cutting, and welding the halves to an interposed structural member.

In addition to use of the power steering pump, power take off pump and onboard compressor outputs from the tractor, various other means are possible to power the trailer. For operation of the lights and controls, it is presently preferred that a standard 12 volt battery be carried on the trailer. The battery power can also be used to drive audible back-up alarms, and a warning signal upon over-deflection of the drawbar, detected, for example, by a limit switch adjacent block 84.

The invention having been disclosed, a number of variations will now be apparent to persons skilled in the art. Reference should be made to the appended claims, rather than the foregoing specification, as indicating the true scope of the subject invention.

What is claimed is:

1. A drawbar trailer for transporting very long, very heavy, substantially rigid loads, comprising:

a substantially rigid and elongated frame carried by at least one front and at least one rear axle and steerable wheel assembly and forming a load support platform;

adjustable resilient means disposed between the platform and the front and rear axles for selectively raising and lowering the front and rear of the platform and for selectively raising and lowering the sides of the platform;

power driven means for selectively turning the wheels of at least one of the front and rear axle and wheel assemblies independently of trailer movement and drawbar movement;

means for automatically controlling and activating the turning means in response to pivotal movements of the drawbar; and, means for securing the load to the platform, whereby the tilt axes of the load platform can be adjusted with respect to the axle and wheel assemblies, and in turn, with respect to terrain features, and whereby the trailer can be easily maneuvered for loading and unloading by selectively turning the wheels relative to one another.

2. The drawbar trailer of claim 1, comprising three front and three rear axle and steerable wheel assemblies, at least one of the front and rear set of axle and wheel assemblies being controlled by the turning means.

3. The drawbar trailer of claim 2, wherein both the front and rear sets of axle and wheel assemblies are controlled by the turning means.

4. The drawbar trailer of claims 1, 2 or 3, wherein the turning means further comprises an hydraulic power assist system.

5. The drawbar trailer of claim 1, wherein the adjustable resilient means comprises at least one inflatable member adjacent each wheel and disposed between the respective axle and the load support platform.

6. The drawbar trailer of claims 1, 2 or 3, comprising first and second means for automatically controlling and activating the turning means disposed at opposite ends of the platform, whereby the trailer may be pulled and automatically steered from either end thereof.

7. A drawbar trailer for transporting rapid transit subway cars, railcars and like vehicles having internal suspension systems, the trailer having a load support platform carried by at least one front and at least one rear axle and steerable wheel assembly, the trailer comprising:

adjustable resilient means disposed between the platform and the front and rear axles for selectively raising and lowering the front and rear of the platform and for selectively raising and lowering the sides of the platform;

hydraulically driven means for turning the wheels of at least one of the axle and wheel assemblies;

means for automatically activating and controlling the hydraulically driven turning means in response to pivotal movements of the drawbar; and, means for holding and immobilizing the bodies of the transported vehicles with respect to the platform, preventing movement of the vehicle bodies on their internal suspension systems, whereby the load support platform may be inclined about its tilt axes to facilitate loading, carrying and unloading the transported vehicle and whereby the trailer can be maneuvered as easily as smaller trailers.

8. The drawbar trailer of claim 7, further comprising means for manually activating and controlling the hydraulically driven turning means, whereby the trailer may be precisely maneuvered in small spaces.

9. The drawbar trailer of claim 8, comprising three front and three rear axle and steerable wheel assemblies, each of the wheels being controllable by the manual and automatic activating means.

10. The drawbar trailer of claim 9, wherein the vehicle body holding means are pivotally mounted to the platform.

11. The drawbar trailer of claim 9, wherein the adjustable resilient means comprises a plurality of inflatable members, at least one of the inflatable members disposed adjacent each wheel and disposed between the respective axle and the load support platform.

12. The drawbar trailer of claim 7, wherein the vehicle body holding means are pivotally mounted to the platform.

13. The drawbar trailer of claim 7, wherein the adjustable resilient means comprises a plurality of inflatable members, at least one of the inflatable members disposed adacent each wheel and between the respective axle and the load support platform.

14. The drawbar trailer of claims 7 or 8, comprising first and second means for automatically activating and controlling the turning means disposed at opposite ends of the load support platform, whereby the trailer may be pulled from either end.

15. A drawbar trailer for transporting very long, very heavy vehicles and the like having internal suspension systems, the trailer having a load support platform carried by at least one front and rear steerable wheel assembly, the trailer comprising;
adjustable resilient means disposed between the platform and the front and rear axles for selectively raising and lowering the front and rear of the platform and for selectively raising and lowering the sides of the platform;
means for automatically turning the wheels of at least one of the front and rear axles and steerable wheel assemblies in response to pivotal movements of the drawbar;
power driven means for selectively turning the wheels independently of one another and independently of the drawbar movement; and,
means for holding and immobilizing the bodies of the transported vehicles relative to the platform, preventing movement of the vehicle bodies on their internal suspension systems.

16. The drawbar trailer of claim 15, comprising three front and three rear axle and steerable wheel assemblies, each of the wheels being controllable by the selective and automatic turning means.

17. The drawbar trailer of claim 15 or 16, wherein the adjustable resilient means comprises a plurality of adjustable resilient mechanisms, at least one of the mechanisms disposed adjacent each wheel and between the respective axle and the load support platform.

18. The drawbar trailer of claim 17, wherein the adjustable resilient mechanisms are inflatable members.

19. A drawbar trailer for transporting very long, very heavy, substantially rigid loads, comprising:
a substantially rigid and elongated frame carried by at least one front and at least one rear axle and steerable wheel assembly and forming a load support platform;
adjustable resilient means disposed between the platform and the front and rear axles for selectively raising and lowering the front and rear of the platform and for selectively raising and lowering the sides of the platform;
means for automatically turning the wheels of at least one of the front and rear axle and steerable wheel assemblies in response to pivotal movements of the drawbar;
power driven means for selectively turning the wheels independently of one another and independently of the drawbar movement; and,
means for securing the load to the platform, whereby the tilt axes of the load support platform can be adjusted with respect to the axle and wheel assemblies, and in turn, with respect to terrain features.

* * * * *